(12) United States Patent
Yokoyama et al.

(10) Patent No.: US 6,533,370 B2
(45) Date of Patent: Mar. 18, 2003

(54) BRAKE APPARATUS FOR VEHICLE

(75) Inventors: Takahisa Yokoyama, Anjo (JP);
Masanobu Yamaguchi, Okazaki (JP);
Takayuki Takeshita, Anjo (JP); Yuzo Imoto, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/983,440

(22) Filed: Oct. 24, 2001

(65) Prior Publication Data

US 2002/0047305 A1 Apr. 25, 2002

(30) Foreign Application Priority Data

Oct. 25, 2000 (JP) ........................ 2000-325723

(51) Int. Cl.[7] ............................... B60T 8/66
(52) U.S. Cl. ........................ 303/163; 303/152
(58) Field of Search ...................... 303/163, 156, 303/157, 158, 168

(56) References Cited

U.S. PATENT DOCUMENTS 3,594,555 A * 7/1971 Klein et al. ................. 303/163
5,021,957 A * 6/1991 Yoshino et al. ............. 303/163
5,588,721 A  12/1996 Asano et al. ................ 303/163
5,884,986 A * 3/1999 Shimizu ...................... 303/10
6,286,637 B1 * 9/2001 Park et al. ................... 303/152

FOREIGN PATENT DOCUMENTS

JP         11-23425          1/1999

* cited by examiner

*Primary Examiner*—Matthew C. Graham
(74) *Attorney, Agent, or Firm*—Law Offices of David G. Posz (57) ABSTRACT

In a vehicle brake apparatus for executing ABS control to prevent a wheel from locking in such a manner that braking force is controlled so as to keep a slip ratio of a wheel at a target slip ratio so that an excessive drop of a wheel speed from a vehicle body speed is adjusted, an output current for driving a braking actuator is set to a current on which oscillating waves are superimposed during ABS control so that the wheel speed changes to show oscillating waves. Even if the wheel speed once drops to an extent that the slip ratio exceeds the target slip ratio, further decrease of the wheel speed is restricted and the wheel speed turns to an increase soon and this cycle is repeated. Accordingly, there occurs no excessive drop of the wheel speed due to the response delay so that sufficient braking force is generated.

11 Claims, 7 Drawing Sheets

SUMMER TIRE

FIG. 6B

STUDLESS TIRE

BRAKE APPARATUS FOR VEHICLE

CROSS REFERENCE TO RELATED APPLICATION

This application is based upon and claims the benefit of priority of Japanese Patent Application No. 2000-325723 filed on Oct. 25, 2000, the content of which is incorporated herein by reference.

BACKGROUND OF THE INVENTION

1. Field of the Invention

The present invention relates to a brake apparatus for a vehicle with ABS control function, in particular, applicable to an electric brake apparatus in which braking force is generated by driving electrically a power source such as a motor.

2. Description of Related Art

Figure 8:
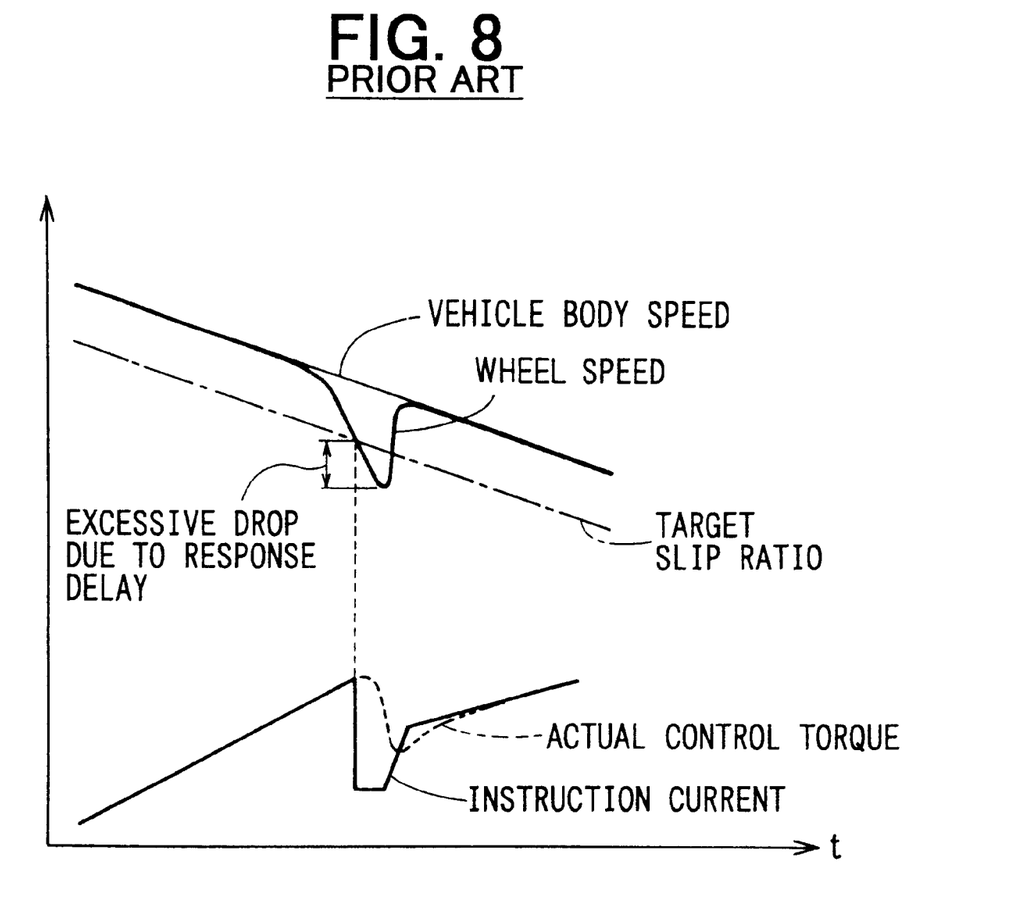
FIG. 8 is a timing chart of ABS control in a conventional brake apparatus.

In ABS control of a conventional brake apparatus, as a brake pedal is stepped on, a braking actuator is driven to gradually increase brake torque as shown in FIG. 8 and, when a wheel speed becomes lower than a vehicle body speed, that is, when a slip ratio becomes larger than a given threshold value (target slip ratio), to rapidly reduce the brake torque so as to avoid a locking tendency.

However, since the brake torque is adjusted by driving the braking actuator for feedback control after the slip ratio exceeds the given threshold, the slip ratio is likely to become too large due to a response delay of the braking actuator. Accordingly, if smaller brake torque is applied to avoid the locking tendency, it will result in a lack of braking force.

Alternatively, it is known to ease an increasing gradient of the brake torque according to slip conditions so as to keep the slip ratio at a given value. However, since an absolute brake torque is unknown, a cycle that the brake torque increases until reaching lock and, after having reached the lock, decreases, will be ineffectively repeated.

SUMMARY OF THE INVENTION

An object of the invention is to provide a brake apparatus which generates effectively sufficient braking force during the ABS control.

To achieve the above object, in a vehicle brake apparatus for executing ABS control to prevent a wheel from locking in such a manner that braking force is controlled so as to keep a slip ratio of a wheel at a target slip ratio so that an excessive drop of a wheel speed from a vehicle body speed is adjusted, the apparatus has slip ratio calculation means for calculating a slip ratio based on vehicle body speed and wheel speed, a braking actuator for adjusting braking force applied to a wheel and a drive circuit for generating an output current by which the braking actuator is driven.

With the brake apparatus mentioned above, the output current during ABS control is set to a current on which oscillating waves are superimposed so that the wheel speed changes to show oscillating waves.

As mentioned above, the wheel speed changes in oscillating waves responsive to a change of the oscillating wave brake torque. Even if the pedal stroke amount of the brake pedal becomes larger and the wheel speed once drops largely below the vehicle body speed to an extent that the slip ratio almost exceeds the target slip ratio, further decrease of the wheel speed is restricted and the wheel speed turns to an increase soon since the wheel speed changes in the oscillating wave form and this cycle is repeated. Since the wheel speed automatically changes from decreasing to increasing irrelevant to the detection as to whether the slip ratio exceeds the target slip ratio, there is no excessive drop of the wheel speed due to the response delay, as the conventional brake apparatus does, so that sufficient braking force is generated.

It is preferable that the oscillating waves of the output current are formed in sine waves.

In more details, the brake apparatus has a braking actuator for adjusting braking force applied to a wheel, a drive circuit for generating an output current by which the braking actuator is driven, slip ratio calculation means for calculating the slip ratio based on the vehicle body speed land the wheel speed, first instruction current calculation means for calculating first instruction current corresponding to a depression state of a brake pedal, second instruction current calculation means for calculating second instruction current necessary for controlling braking force so as to keep the slip ratio at a vicinity of the target slip ratio once the slip ratio exceeds the target slip ratio during ABS control, comparison means for comparing the first instruction current with the second instruction current and generating third instruction current, which is set to the first instruction current when the second instruction current is larger than the first instruction current and to the second instruction current when the second instruction current is smaller than the first instruction current, and oscillating wave calculation means for generating fourth instruction current formed by superimposing oscillating waves on the third instruction current.

With the brake apparatus mentioned above, the fourth instruction current during ABS control corresponds to the output current by which the braking actuator is driven so that the wheel speed changes to show oscillating waves.

On detecting whether or not the wheel speed drops to an extent that the slip ratio exceeds the target slip ratio, it is preferable to use an integration value of the slip ratio, that is, an integration value of differences between the wheel speed and the vehicle body speed, a variation range of the wheel speed or a phase delay of the oscillating waves of the wheel speed from those of the output current.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS (First Embodiment)

A structure of a brake apparatus for a vehicle is described with reference to FIG. 1.

Figure 1:
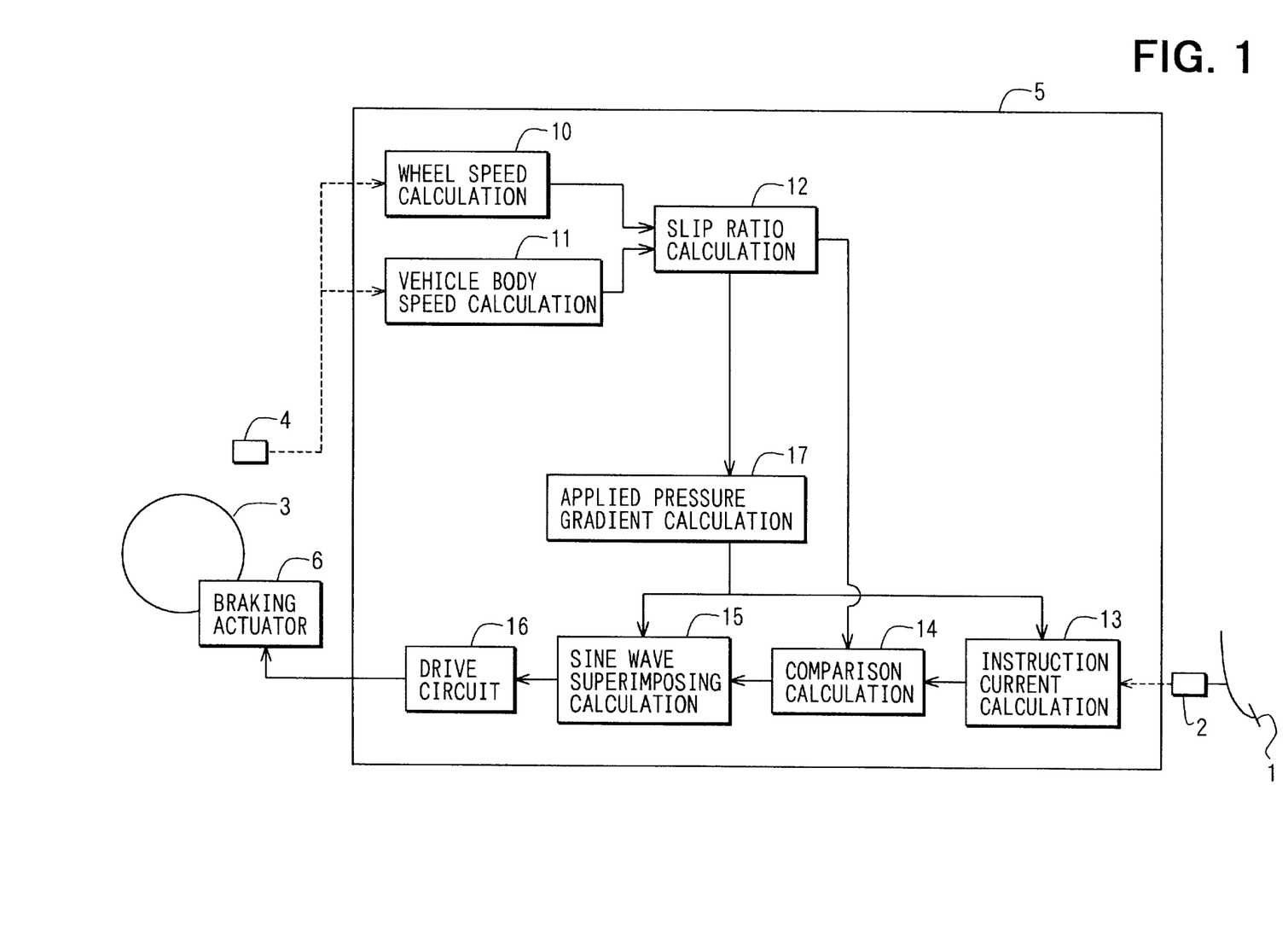
FIG. 1 is a block diagram showing an entire structure of a vehicle brake apparatus according to a first embodiment of the present invention.

As shown in FIG. 1, the brake apparatus for a vehicle is provided with a brake pedal sensor 2 that outputs a signal corresponding to a pedal stroke amount, a wheel speed sensor 4 that outputs a signal representing a rotation state of a wheel 3, an electric control unit (hereinafter referred to ECU) 5 that executes various calculation processes based on signals of the brake pedal sensor 2 and the wheel speed sensor 4, and a braking actuator 6 that is driven according to a result of the calculation processes of ECU 5. The braking actuator 6 generates a given braking force applied to the wheel 3 when the braking actuator 6 is driven according to the calculation result of ECU 5.

The vehicle has four wheels 3, though FIG. 1 shows only one of the four wheels 3, and is provided with the wheel speed sensor 4 and the braking actuator 6 corresponding to each of the four wheels 3.

The brake pedal sensor 2 is, for example, a stroke sensor that detects a travel distance of the brake pedal 1. The wheel speed sensor 4 is, for example, a pick-up type sensor that outputs signals according to rotation of a teeth shaped rotor rotatable together with the wheel 3.

The braking actuator 6 is, for example, a motor installed on a disk brake or a drum brake for producing pressure applied to the brake disk or shoes of the dram brake so that the wheel 3 receives a braking force.

ECU 5 has wheel speed calculation means 10 that calculate each wheel speed of the wheels 3 based on a detection signal of each of the wheel speed sensors 4, vehicle body speed calculation means 11 that calculate a vehicle body speed (estimated vehicle body speed) based on the wheel speeds of the four wheels 3, and slip ratio calculation means 12 that calculate each slip ratio ρ of the wheels 3 from calculated results of the each of the wheel speeds and the vehicle body speed and determine whether or not the calculated slip ratio ρ exceeds a target slip ratio. The vehicle body speed is calculated by a known method, for example, based on a maximum speed among the wheel speeds of the four wheels 3. The slip ratio ρ is calculated, for example, according to a calculation formula, ρ=(vehicle body speed− wheel speed)/vehicle body speed.

Further, ECU 5 has instruction current calculating means 13 that, upon estimating applied pressure necessary for the braking actuator 6 to produce a braking force corresponding to the pedal stroke amount, calculate current (hereinafter referred to first instruction current) to be applied to the braking actuator 6 in order to produce the applied pressure.

ECU is furthermore provided with comparison calculation means 14 that produce a thirst instruction current as a result of comparison between the calculated first instruction current and a second instruction current separately calculated based on the slip ratio, sine wave superimposing calculation means 15 for calculating a fourth instruction current in which sine waves are superimposed on the calculated third instruction current, drive circuit means 16 for generating an output current based on the calculated result of the sine waves superimposing calculation means, and applied pressure gradient calculation means 17 for calculating a gradient of the applied pressure that the braking actuator 6 produces.

The detected signal of the brake pedal sensor 2 and the calculation result of the applied pressure gradient calculation means 17 are inputted to the instruction current calculation means 13 where the first instruction current necessary for producing the applied pressure corresponding to the pedal stroke amount is calculated. The first instruction current, which is variable according to operating conditions of the vehicle, is calculated by adding or deducting the gradient of applied pressure calculated by the applied pressure gradient calculation means 17 to or from the applied pressure calculated thereby at an immediately previous time.

The comparison calculation means 14 has means for calculating the second instruction current based on the slip ratio and comparison means for comparing the second instruction current with the first instruction current. For example, for adjusting the braking force to keep the target slip ratio during the ABS control, it becomes necessary that the current not corresponding to the pedal stroke amount, which is the second instruction current, is applied to the braking actuator 6. Accordingly, the comparison calculation means 14 select one of the first and second instruction currents according to the condition then governing and the selected instruction current is the third instruction current.

The sine wave superimposing calculation means 15 determines a final instruction current. In more details, the final instruction current is a fourth instruction current formed by superimposing the sine waves on the third instruction current when ABS control is executed or the first instruction current for producing the applied pressure corresponding to the pedal stroke amount when ABS control is not executed. The sine wave, whose frequency is, typically, 0 to 10 Hz (preferably, 3 to 5 Hz) and whose amplitude is constant, is superimposed in the sine wave superimposing calculation means 15.

The drive circuit means 16 generate the output current based on the final instruction current applied to the braking actuator 6.

Figure 2:
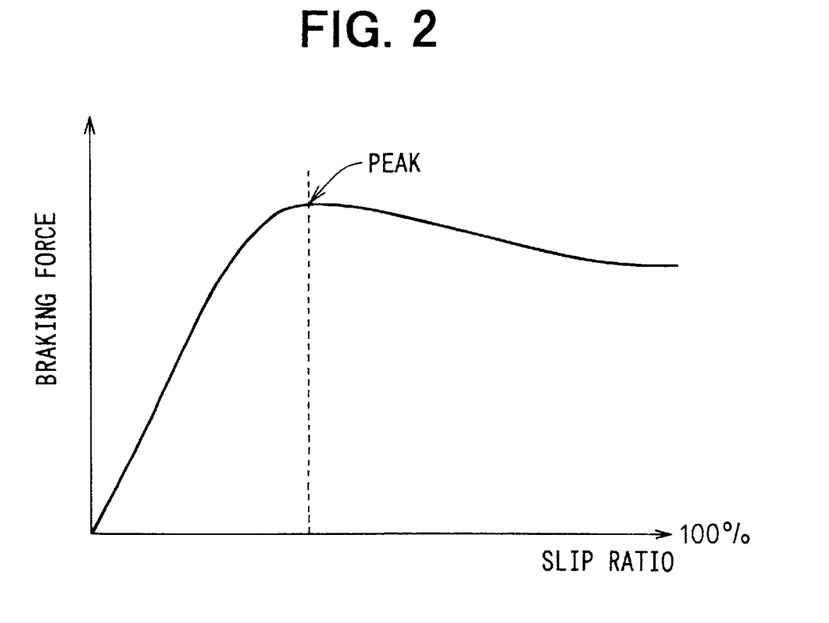
FIG. 2 is a chart showing a relationship between slip ratio and braking force.

A calculation result from the slip ratio calculation means 12 is inputted to the applied pressure gradient calculation means 17 for calculating the applied pressure gradient. A calculation method of the applied pressure gradient is described with reference to FIG. 2, which illustrates a relationship between the slip ratio and the braking force. As shown in FIG. 2, as the slip ratio increases at an initial stage when the wheel is falling within a lock state, the braking force sharply increases. However, the braking force shows a peak when the slip ratio reaches a given value and, after the peak, the braking force decreases as the slip ratio further increases. Accordingly, when the slip ratio calculated by the slip calculation means 12 is within a range smaller than the target slip ratio corresponding to the peak mentioned above, a larger value of the applied pressure gradient is set since, if the braking actuator 6 produces larger applied pressure to have the slip ratio higher, the braking force to be produced is larger.

To the contrary, when the slip ratio is equal to or exceeds the target slip ratio corresponding to the peak, a smaller value of the applied pressure gradient is set since, if the braking actuator 6 produces larger applied pressure to have the slip ratio higher (the wheel speed further drops so that the lock tendency of the wheel is further enhanced), braking force to be produced is smaller. A method of determining whether or not the slip ratio, which becomes higher as the lock tendency is more enhanced, exceeds the target value is described later.

As mentioned above, the first instruction current calculated by the instruction calculating means 13 has a value representing the vehicle operating condition, since the applied pressure gradient is calculated in consideration of the slip ratio.

Figure 3:
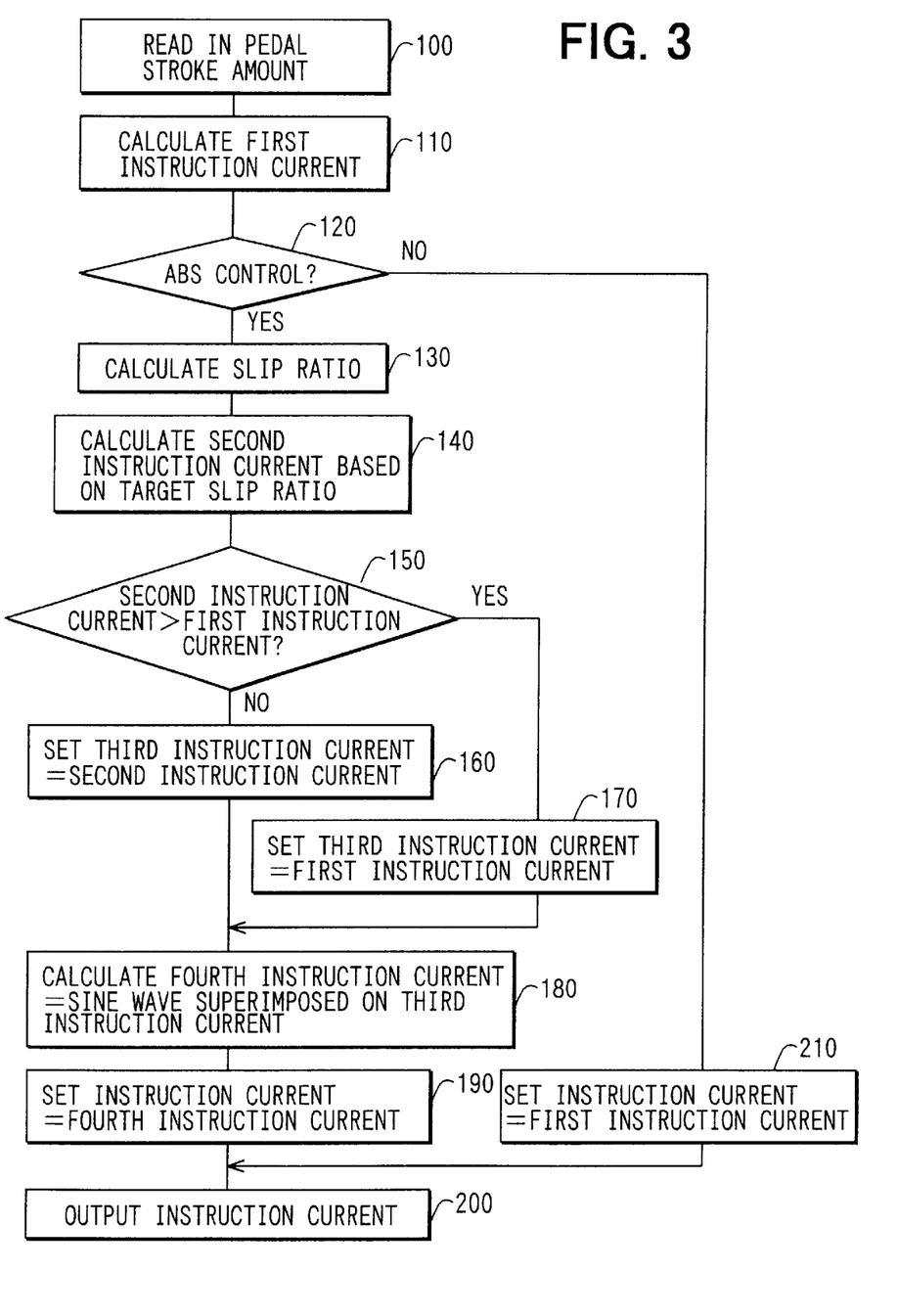
FIG. 3 is a flow chart showing ABS control processes executed by the vehicle brake apparatus shown in FIG. 1.

Next, details of the ABS control processes of the brake apparatus mentioned above is described with reference a flow chart shown in FIG. 3.

The pedal stroke amount is read in at Step 100. That is, the detected signal from the brake pedal sensor 2 is read in. At Step 111, the first instruction current corresponding to the pedal stroke amount of each of the wheels 3 based on the detected signal from the brake pedal sensor 2.

At Step 120, whether or not the ABS control is under way is determined, for example, by recognizing a flag, which is raised when the slip ratio calculated in the slip calculating means 12 exceeds the target value or a given value (typically, 10%). The flag is lowered when the vehicle stops.

When the answer at Step 120 is positive, the process goes to Step 130 and, when the answer is negative, to Step 210. After setting the first instruction current as the instruction current applicable to the braking actuator 6 of each of the wheels 3 at Step 210, the process goes to Step 200.

At Step 130, the slip ratio of each of the wheels 3 is calculated in use of the calculation formula mentioned above based on the calculation results of the wheel speed calculation means 10 and the vehicle body speed calculation means 11.

At Step 140, the second instruction current corresponding to the target slip ratio is calculated in the comparison calculation means 14 based on the calculation result of the slip ratio calculation means 12.

At Step 150, the second instruction current calculated at Step 140 is compared to the first instruction current calculated at Step 110 and whether or not the second instruction current is larger than the first instruction current is determined. When the answer is negative at Step 150, the process goes to Step 160 where the second instruction current is set as the third instruction current. When the answer is positive at Step 150, the process goes to Step 170 where the first instruction current is set as the third instruction current. That is, since it is impossible to produce the braking force that is larger than the depressing force of the brake pedal 1, even if the second instruction current is larger than the first instruction current, the first instruction current corresponding to the actual depressing force is set as the third instruction current in this case.

At Step 180, the fourth instruction current composed of the sine waves superimposed on the third instruction current is calculated. After the fourth instruction current is set as the instruction current applicable to the braking actuator 6 of each of the wheels 3 at Step 190, the process goes to Step 200.

At Step 200, the output current corresponding to the instruction current set at Step 190 or 210 is applied to the braking actuator of each wheel 3 so that the braking force corresponding to the instruction current is generated in each wheel.

Figure 4:
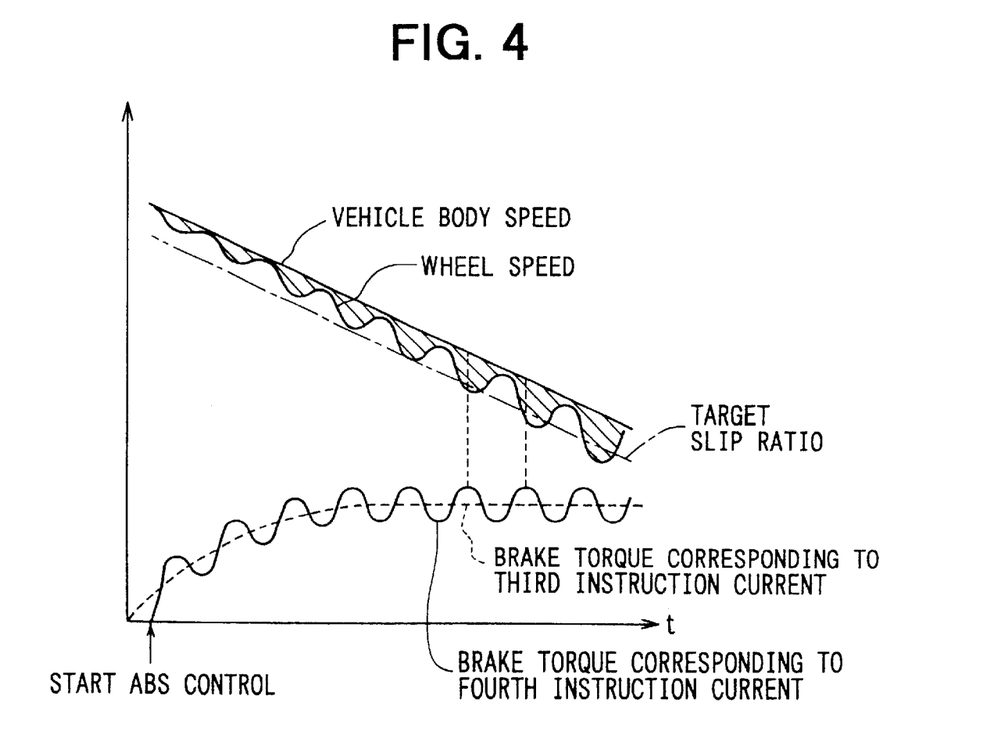
FIG. 4 is a timing chart showing relationships among vehicle body speed, wheel speed, target slip ratio, torque corresponding to third instruction current and torque corresponding to fourth instruction current.

FIG. 4 is a timing chart on executing the ABS control process. In FIG. 4, the relationships among the vehicle body speed, the wheel speed, the target slip ratio, the brake torque corresponding to the third instruction current and the brake torque corresponding to the fourth instruction current (Sine waves are superimposed on the third instruction current).

As shown in FIG. 4, on starting ABS control, the fourth instruction current composed of the sine waves superimposed on the third instruction current (first instruction current) is set so that the brake torque of each wheel 3 is a sine wave brake torque corresponding to the fourth instruction current. Accordingly, the wheel speed changes in sine waves responsive to a change of the sine wave brake torque. Even if the pedal stroke amount of the brake pedal 1 becomes larger and the wheel speed once drops largely below the vehicle body speed to an extent that the slip ratio almost exceeds the target slip ratio, further decrease of the wheel speed is restricted and the wheel speed turns to an increase soon since the wheel speed changes in the sine wave form and this cycle is repeated.

In the brake apparatus according to the present embodiment, since the wheel speed automatically changes from decreasing to increasing irrelevant to the detection as to whether the slip ratio exceeds the target slip ratio, there is no excessive drop of the wheel speed due to the response delay, as the conventional brake apparatus does, so that sufficient braking force is generated.

As a method of detecting whether or not the slip ratio exceeds the target slip ratio, an integration of difference between the wheel speed and the vehicle body speed is used. That is, an integrated value of areas sandwiched between a line of the wheel speed and a line of the vehicle body speed as shown by slash lines in FIG. 4 is used. By detecting whether or not the value of the areas exceeds a given threshold value, whether or not the slip ratio exceeds the target slip ratio due to a drop of the wheel speed is detected.

After the slip ratio exceeds the target slip ratio, the third (second) instruction current is set so as to suppress the increasing of the braking force so that the fourth instruction current formed by superimposing the sine waves on the third (second) instruction current causes the wheel speed to turn to increasing from decreasing in a vicinity of a point corresponding to the target slip ratio. Accordingly, braking operation control is performed within a range not far from the vicinity of the target slip where the highest braking force is secured.

According to the embodiment mentioned above, even if the wheel speed drops below the point corresponding to the target slip ratio, it turns automatically to increasing soon, since the braking actuator is controlled by the instruction current on which the sine waves are superimposed, resulting in no lack of the braking force.

(Second Embodiment)

Instead of integrating the difference between the wheel speed and the vehicle body speed as described in the first embodiment, whether the slip ratio exceeds the target slip ratio is detected by the other method according to second embodiment.

Figure 5:
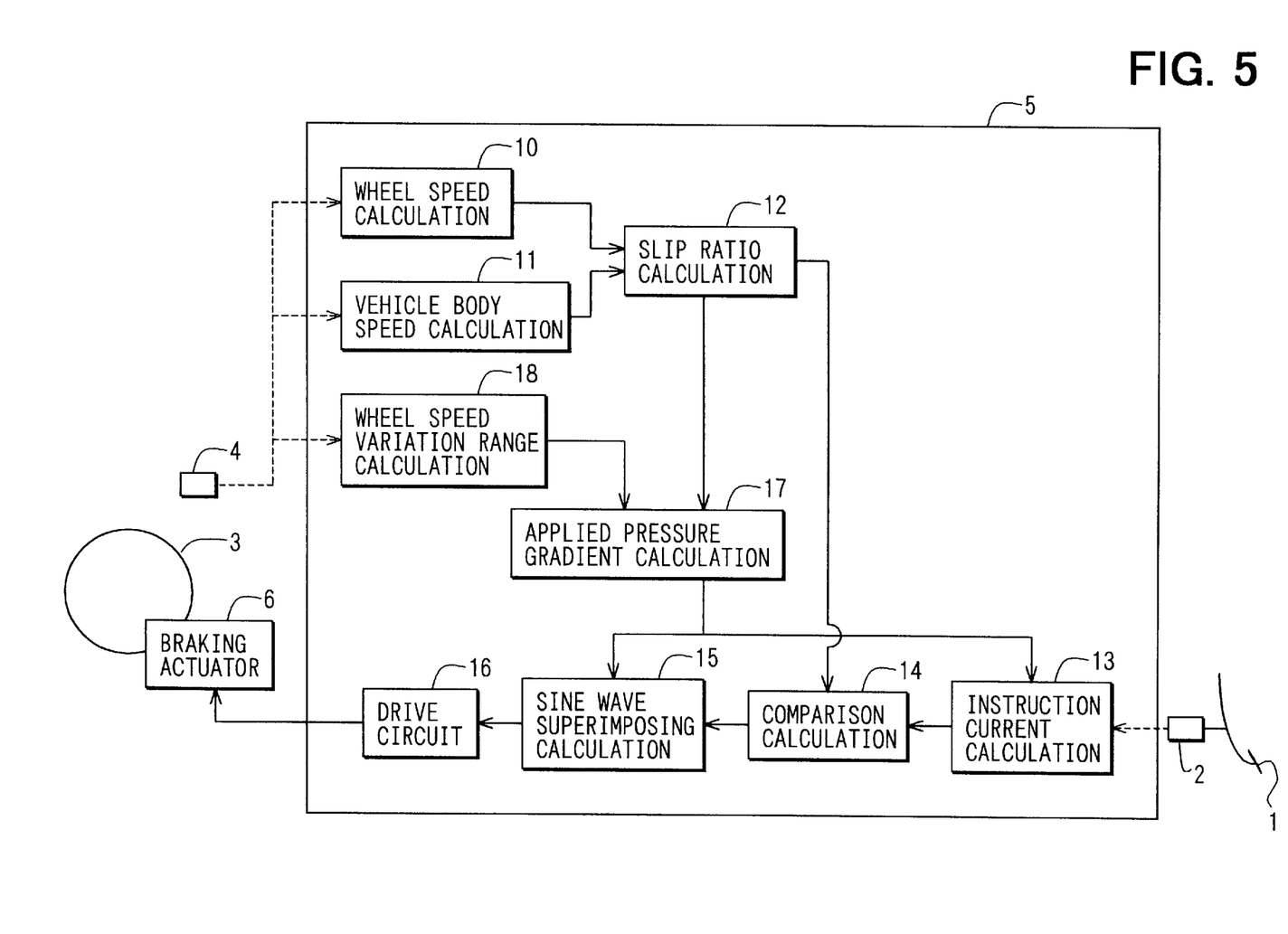
FIG. 5 is a block diagram showing an entire structure of a vehicle brake apparatus according to a second embodiment of the present invention.

As shown in FIG. 5, the brake apparatus according to the second embodiment is provided with wheel speed variation range calculating means 18 and the other constructions thereof are similar to those of the first embodiment. Further, as ABS control processes of the brake apparatus according to the second embodiment is similar to the first embodiment, a description of details thereof is omitted.

In the wheel speed variation range calculation means 18, a variation range of the wheel speed is calculated for detecting whether or not the slip ratio exceeds the target slip ratio. When a calculated value of the variation range exceeds a given threshold value, it is determined that the slip ratio exceeds the target slip ratio.

As noticed from the drawing of FIG. 4, the variation range of the wheel speed, that is, an amplitude range of the sine wave of the wheel speed, is gradually larger and, when the slip ratio exceeds the target slip ratio, exceeds the given threshold value. Accordingly, the braking operation based on the determination of the target slip ratio by detecting the variation range of the wheel speed has the same advantage as that of the first embodiment.

Figure 6A:
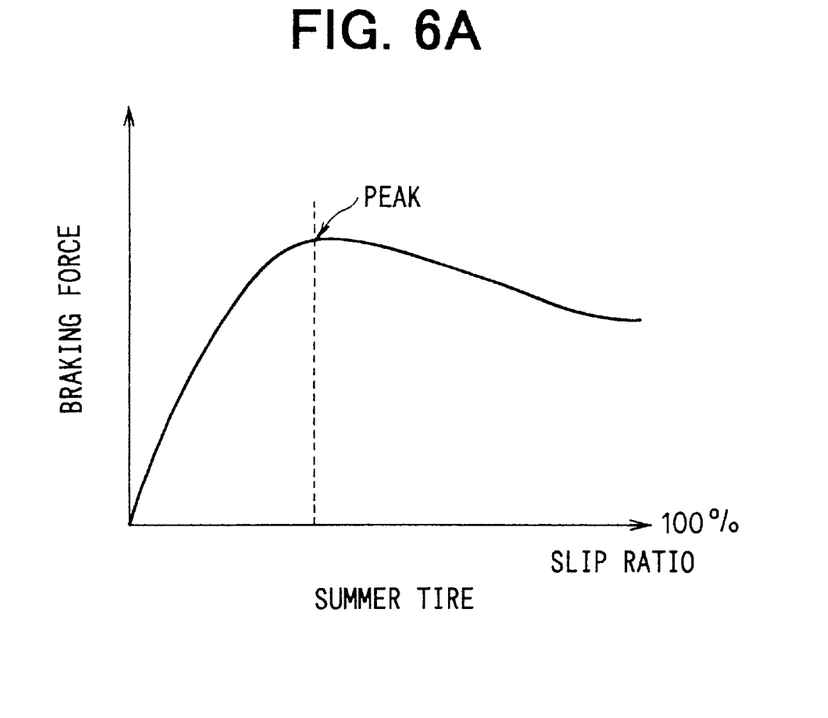
FIG. 6A is a chart showing a relationship between slip ratio and braking force in a summer tire.
Figure 6B:
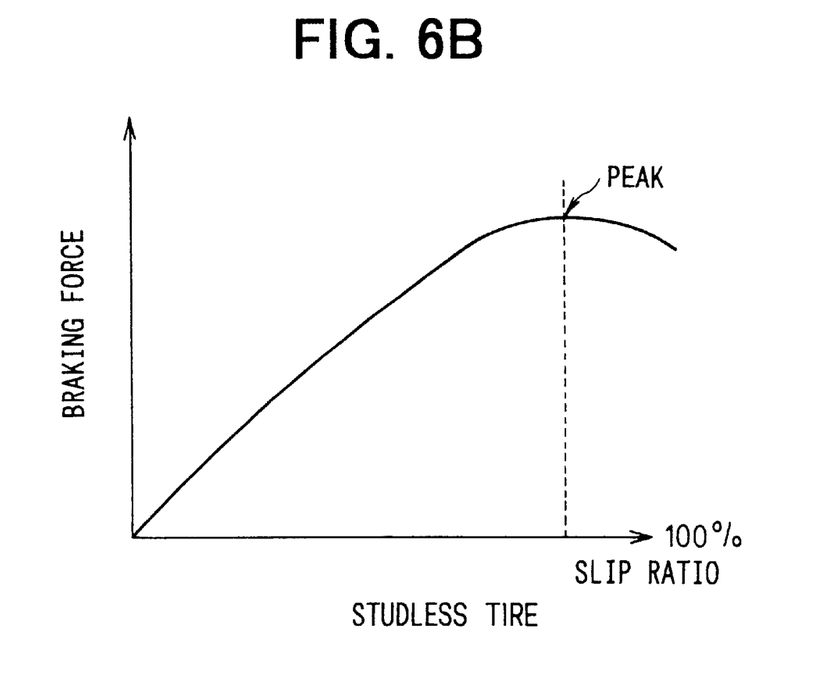
FIG. 6B is a chart showing a relationship between slip ratio and braking force in a studless tire.

The peak described in the relationship between the slip ratio and the braking force as shown in FIG. 2 is variable depending on a tire characteristic or a road condition. For example, as shown in FIGS. 6A and 6B, the peak in the relationship between the slip ratio and the braking force of a summer tire (radial tire) is shifted from that of a studless tire.

However, according to the second embodiment, the peak is easily detected since the variation range of the wheel speed becomes larger than the threshold value when the wheel speed drops to an extent that the slip ratio exceeds the target slip ratio. Accordingly, the second instruction current is calculated based on the peak so that braking operation is controlled to maintain the vicinity of the target slip ratio. Further, even if friction coefficient μ of the road is suddenly changed, the peak is detected at once so that brake operation is controlled so as to immediately response to the sudden change of the friction coefficient.

(Third Embodiment)

According to the brake apparatus according to a third embodiment, the target slip ratio is detected by a method different from that of the first or second embodiment.

Figure 7:
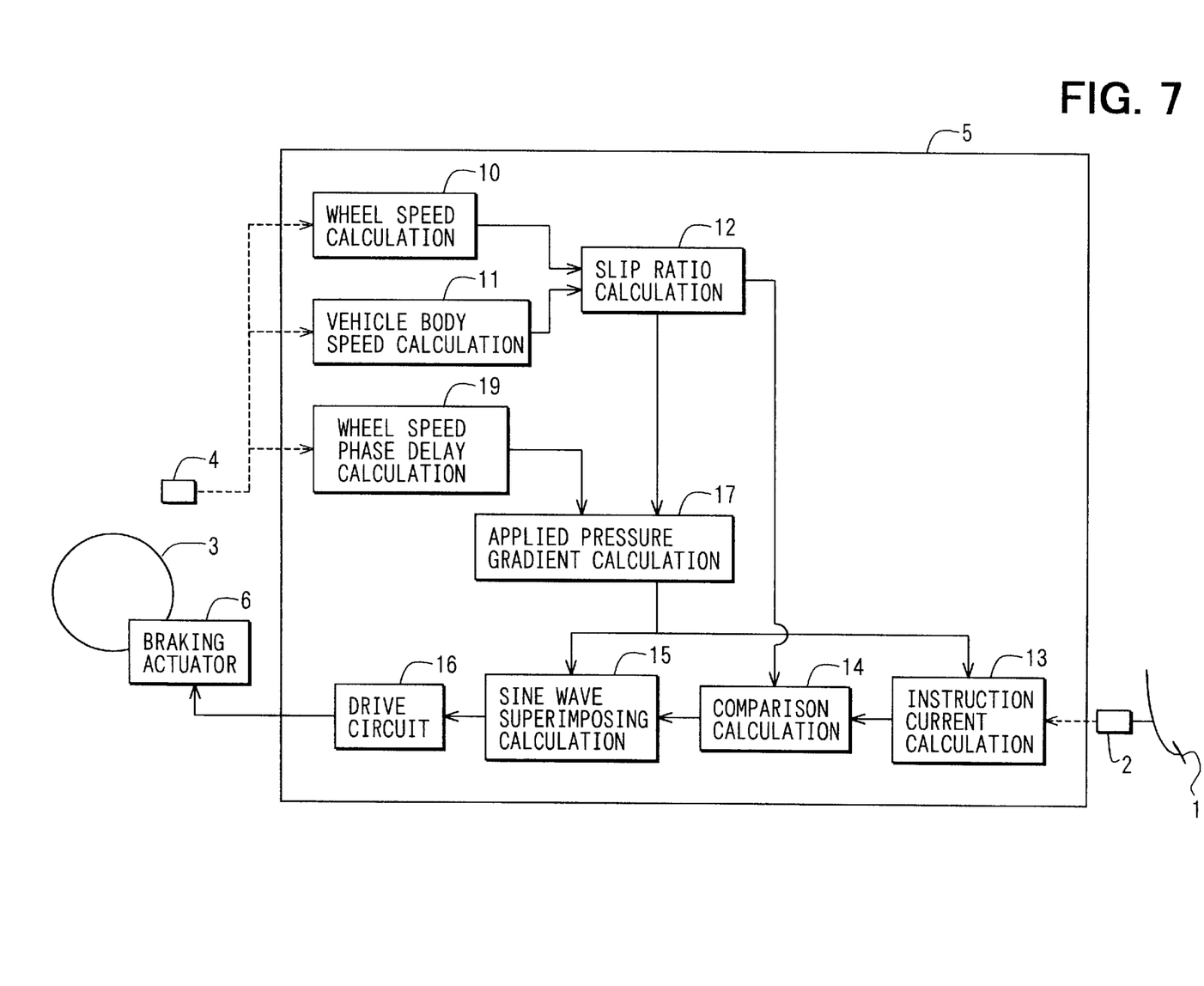
FIG. 7 is a block diagram showing an entire structure of a vehicle brake apparatus according to a third embodiment of the present invention.

As shown in FIG. 7, the brake apparatus according to the third embodiment is provided with wheel speed phase delay calculating means 19 and the other constructions thereof are similar to those of the first embodiment. Further, as ABS control processes of the brake apparatus according to the third embodiment is similar to the first embodiment, a description of details thereof is omitted.

In the wheel speed phase delay calculation means 19, a phase delay of the sine wave of the wheel speed compared to a phase of the sine wave of the first instruction current is calculated for detecting whether or not the slip ratio exceeds the target slip ratio. When a calculated value of the phase delay exceeds a given threshold value, it is determined that the slip ratio exceeds the target slip ratio.

As noticed from the drawing of FIG. 4, the phase delay of the sine waves of the wheel speed is gradually larger and, when the slip ratio exceeds the target slip ratio, exceeds the given threshold value. Accordingly, the braking operation based on the determination of the target slip ratio by detecting the phase delay of the wheel speed has the same advantage as that of the first embodiment.

Further, even if a position of the peak is shifted depending on a tire characteristic or a road condition, the peak is easily detected since the phase delay of the wheel speed becomes larger than the threshold value when the wheel speed drops to an extent that the slip ratio exceeds the target slip ratio. Accordingly, the second instruction current is calculated based on the peak so that braking operation is controlled to maintain the vicinity of the target slip ratio. Furthermore, even if the friction coefficient g of the road is suddenly changed, the peak is detected at once so that brake operation is controlled so as to immediately response to the sudden change of the friction coefficient, similarly to the second embodiment.

In the embodiments mentioned above, the amplitude of the sine waves superimposed on the third instruction current is constant. However, the amplitude of the sine waves may be variable according to the slip ratio. For example, when a driver depresses the brake pedal 1 rapidly (at a speed more than a given value), a larger amplitude of the sine wave is set so that the slip ratio of the wheel reaches the target slip ratio in a shorter time and, after reaching the target slip ratio, a smaller amplitude of the sine wave is set to prevent the wheel speed from dropping largely.

Instead of executing ABS control by detecting the target slip ratio based on the integration of the slip ratio of the wheel, the variation range of the wheel speed and the phase delay of the wheel speed, as mentioned above, ABS control may be executed by detecting the target slip ratio based on acceleration of the sine wave wheel speed that turns to increasing after the wheel speed stops decreasing (based on an increasing gradient of the wheel speed), since the increasing gradient of the wheel speed before reaching the peak is different from that after reaching the peak.

Further, instead of the sine waves superimposed on the third instruction current, any oscillating wave such as a triangle wave or a saw teeth shaped wave may be superimposed on the third instruction current, if the oscillating wave causes the wheel speed to return from decreasing to increasing in the vicinity of the target slip ratio.

Furthermore, the method using the integration of slip ratio of the wheel, the variation range of the wheel speed, the phase delay of the wheel speed or the increasing gradient of the wheel speed may be used not only to detect the target slip ratio for ABS control of the vehicle brake apparatus but also to estimate a friction coefficient of the road.

The friction coefficient of the road may be estimated not only at a timing of ABS control but also at the other timing. For example, at a time when the brake pedal is not depressed during vehicle cruising, the friction coefficient of the road is estimated by generating braking force during a short time to an extent that a driver does not feel the braking and detecting a behavior of the wheel speed. This method enables to estimate the friction coefficient of the road in advance before actual braking.

What is claimed is:

1. A vehicle brake apparatus having slip ratio calculation means for calculating a slip ratio based on vehicle body speed and wheel speed in which ABS control is executed to prevent a wheel from locking in such a manner that braking force is controlled so as to keep the slip ratio at a target slip ratio so that an excessive drop of the wheel speed from the vehicle body speed is adjusted, comprising:

a braking actuator for adjusting braking force applied to a wheel;

a drive circuit for generating an output current by which the braking actuator is driven, wherein the output current during ABS control is a current on which oscillating waves are superimposed so that the wheel speed changes to show oscillating waves; and wheel speed phase delay calculation means for calculating a phase delay of the oscillating waves of the wheel speed from those of the output current and detecting whether the wheel speed drops to an extent that the slip ratio exceeds the target slip ratio in use of the calculated phase delay.

2. A vehicle brake apparatus in which ABS control is executed to prevent a wheel from locking in such a manner that braking force is controlled so as to keep a slip ratio of a wheel at a target slip ratio so that an excessive drop of wheel speed from vehicle body speed is adjusted, comprising:

a braking actuator for adjusting braking force applied to a wheel;

a drive circuit for generating an output current by which the braking actuator is driven;

slip ratio calculation means for calculating the slip ratio based on the vehicle body speed and the wheel speed;

first instruction current calculation means for calculating first instruction current corresponding to a depression state of a brake pedal;

second instruction current calculation means for calculating second instruction current necessary for controlling braking force so as to keep the slip ratio at a vicinity of the target slip ratio once the slip ratio exceeds the target slip ratio during ABS control;

comparison means for comparing the first instruction current with the second instruction current and generating third instruction current, the third instruction current being the first instruction current when the second instruction current is larger than the first instruction current and the second instruction current when the second instruction current is smaller than the first instruction current;

oscillating wave calculation means for generating fourth instruction current formed by superimposing oscillating waves on the third instruction current, wherein the fourth instruction current during ABS control corresponds to the output current by which the braking actuator is driven so that the wheel speed changes to show oscillating waves.

3. A vehicle brake apparatus according to claim 2, wherein the slip ratio calculation means further detects whether or not the wheel speed drops to an extent that the slip ratio exceeds the target slip ratio in use of an integration value of the slip ratio after starting ABS control.

4. A vehicle brake apparatus according to claim 2, wherein the slip ratio calculation means further detects whether or not the wheel speed drops to an extent that the slip ratio exceeds the target slip ratio in use of an integration value of differences between the wheel speed and the vehicle body speed after starting ABS control.

5. A vehicle brake apparatus according to claim 2, further comprising:

wheel speed variation calculation means for calculating a variation range of the wheel speed and detects whether or not the wheel speed drops to an extent that the slip ratio exceeds the target slip ratio in use of the calculated variation range.

6. A vehicle brake apparatus according to claim 2, further comprising:

wheel speed phase delay calculation means for calculating a phase delay of the oscillating waves of the wheel speed from those of the output current and detects whether or not the wheel speed drops to an extent that the slip ratio exceeds the target slip ratio in use of the calculated phase delay.

7. A vehicle brake apparatus according to claim 2, wherein the oscillation waves of the wheel speed oscillates to keep the slip ratio at a vicinity of the target slip ratio so that an increase of braking force is restricted.

8. A vehicle brake apparatus according to claim 2, wherein the oscillating waves of the output current are formed in sin waves.

9. A vehicle brake apparatus having slip ratio calculation means for calculating a slip ratio based on vehicle body speed and wheel speed in which ABS control is executed to prevent a wheel from locking in such a manner that braking force is controlled so as to keep the slip ratio at a target slip ratio so that an excessive drop of the wheel speed from the vehicle body, speed is adjusted, comprising:

a braking actuator for adjusting braking force applied to a wheel; and a drive circuit for generating an output current by which the braking actuator is driven, wherein the output current during ABS control is a current on which oscillating waves are superimposed so that the wheel speed changes to show oscillating waves and wherein the slip ratio calculation means further detects whether or not the wheel speed drops to an extent that the slip ratio exceeds the target slip ratio in use of an integration value of the slip ratio after starting ABS control.

10. A vehicle brake apparatus having slip ratio calculation means for calculating a slip ratio based on vehicle body speed and wheel speed in which ABS control is executed to prevent a wheel from locking in such a manner that braking force is controlled so as to keep the slip ratio at a target slip ratio so that an excessive drop of the wheel speed from the vehicle body speed is adjusted, comprising:

a braking actuator for adjusting braking force applied to a wheel; and a drive circuit for generating an output current by which the braking actuator is driven, wherein the output current during ABS control is a current on which oscillating waves are superimposed so that the wheel speed changes to show oscillating waves, and wherein the slip ratio calculation means further detects whether or not the wheel speed drops to an extent that the slip ratio exceeds the target slip ratio in use of an integration value of differences between the wheel speed and the vehicle body speed after starting ABS control.

11. A vehicle brake apparatus having slip ratio calculation means for calculating a slip ratio based on vehicle body speed and wheel speed in which ABS control is executed to prevent a wheel from locking in such a manner that braking force is controlled so as to keep the slip ratio at a target slip ratio so that an excessive drop of the wheel speed from the vehicle body speed is adjusted, comprising:

a braking actuator for adjusting braking force applied to a wheel;

a drive circuit for generating an output current by which the braking actuator is driven, wherein the output current during ABS control is a current on which oscillating waves are superimposed so that the wheel speed changes to show oscillating waves, and wheel speed variation calculation means for calculating a variation range of the wheel speed and detecting whether the wheel speed drops to an extent that the slip ratio exceeds the target slip ratio in use of the calculated variation range.

* * * * *